(12) United States Patent
Ivan

(10) Patent No.: US 8,505,713 B1
(45) Date of Patent: Aug. 13, 2013

(54) GUIDE ROLLER FOR CENTERING CONVEYOR BELTS

(75) Inventor: Frank Ivan, Echo Bay (CA)

(73) Assignee: Frank Ivan, Echo Bay Ontario (CA)

( * ) Notice: Subject to any disclaimer, the term of this patent is extended or adjusted under 35 U.S.C. 154(b) by 0 days.

(21) Appl. No.: 13/545,590

(22) Filed: Jul. 10, 2012

(51) Int. Cl.
*B65G 21/20* (2006.01)

(52) U.S. Cl.
USPC .............. 198/840; 198/837; 198/810.03

(58) Field of Classification Search
USPC .................... 198/810.03, 837, 840, 842
See application file for complete search history.

(56) References Cited

U.S. PATENT DOCUMENTS

| | | | | | |
|---|---|---|---|---|---|
| 3,762,561 | A | * | 10/1973 | Davis | 210/401 |
| 3,913,729 | A | * | 10/1975 | Andrews | 198/810.03 |
| 3,927,814 | A | * | 12/1975 | Holm | 198/837 |
| 3,956,632 | A | * | 5/1976 | Hall et al. | 198/810.03 |
| 4,024,949 | A | * | 5/1977 | Kleysteuber et al. | 198/831 |
| 5,605,596 | A | * | 2/1997 | McLaughlin | 156/395 |
| 6,390,287 | B2 | * | 5/2002 | Riffe | 198/810.03 |
| 6,471,046 | B2 | * | 10/2002 | Layne et al. | 198/831 |

* cited by examiner

*Primary Examiner* — James R Bidwell

(57) ABSTRACT

A guide roller for centering conveyor belts for a conveyor assembly. The roller has a securing end for attachment to the conveyor assembly and a substantially cylindrical body adapted to receive a conveyor belt thereon and having a first end, a second end and an undercut portion positioned substantially between the first end and the second end, which is adapted to receive and secure therein a belt edge of a conveyor belt. The first end and second have a greater diameter than that of the undercut portion, so that the belt edge of the belt is secured without lateral movement of the belt.

3 Claims, 2 Drawing Sheets

GUIDE ROLLER FOR CENTERING CONVEYOR BELTS

The present invention relates to a guide roller meant to be used for centering conveyor belts, and, more particularly, to a guide roller for centering conveyor belts for a conveyor assembly that senses if the belt is out of a neutral position, where upon the guide roller restores the belt's return on the guide rollers to a neutral position.

BACKGROUND OF THE INVENTION

Mass material can typically be conveyed on belt conveyors, which are usually made of rubber and are relatively thin. However, the belt must be sufficiently strong to ensure that it withstands the force it is subjected to by the drive mechanism of the belt and the tensile load caused by the mass conveyed on the belt. It is known that belts can be vulcanized and plastic fibre and/or steel threads added into the structure of the belts to reinforce them for increased strength.

Nevertheless, the belt must be resilient and sufficiently thin to allow for reliable and economical power transmission between the belt and the drum driving the belt. As such, a thin belt is preferred. A thin belt is not, however, stable in the lateral direction, and it is known that several situations can occur which may lead to the belt drifting laterally. Such situations may be caused, for example, by material being stuck on the belt or the roller, incorrect alignment of the rollers/drums or even a damaged roller. Such lateral drifting of the belt may cause the belt to be emptied of the material loaded on the belt. In addition, lateral edges of the belt may rub against the frame of the conveyor structure and thereafter become damaged. Since the conveyor belt is usually the most expensive component in a belt conveyor system, and the most essential one for the operation of the equipment, it is critical that every effort is made to prevent the conveyor belt from damage.

Conventionally, for the purpose of centering the conveyor belt, various guiding roller racks have been constructed, but they have been found somewhat operationally unreliable. A further problem with conventional guide rollers is that they involve insufficient guiding efficiency. It has also proved particularly problematic to construct a guide roller which functions properly in conveyor systems where the conveyor belt is driven in two directions.

It would therefore be advantageous to have an improved guide roller for centering conveyor belts.

It would be further advantageous to have an improved guide roller for centering conveyor belts that senses if the belt is out of a neutral position, where upon the guide roller restores the belt's return on the guide rollers to a neutral position. To this end, the present invention effectively addresses this need.

SUMMARY OF THE INVENTION

The present invention provides an improved guide roller for centering conveyor belts on a conveyor assembly.

The present invention also provides an improved guide roller for centering conveyor belts that senses if the belt is out of a neutral position, where upon the guide roller restores the belt's return on the guide rollers to a neutral position.

According to a broad aspect of an embodiment of the present invention, there is disclosed a guide roller for attachment to a conveyor assembly, the guide roller comprising a securing end for attachment to the conveyor assembly, the securing end being positioned at a distal end of the guide roller; and a substantially cylindrical body adapted to receive a conveyor belt thereon, the body having:
a first end;
a second end disposed generally opposite said first end;
an undercut portion positioned substantially between the first end and the second end and adapted to receive and secure therein a belt edge of a conveyor belt, the first end and the second end each having a greater diameter than that of the undercut portion.

An important advantage of the present invention is that it provides an improved guide roller for centering conveyor belts that senses if the belt is out of a neutral position, where upon the guide roller restores the belt's return on the guide rollers to a neutral position.

Another important advantage of the present invention is that it provides an improved guide roller for centering conveyor belts that constantly corrects the belt relation to position the conveyor belt on both sides of the conveyor to a neutral position.

A further important advantage of the present invention is that it provides an improved guide roller for centering conveyor belts which is designed to encapsulate the full movement of the conveyor belt in both lateral and vertical positions from the outer leading edge of the belt, whereby, when the belt has been centered, the belt will travel in a longitudinal direction correctly.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention consists of an improved guide roller for centering conveyor belts that senses if the belt is out of a neutral position, where upon the guide roller restores the belt's return on the guide rollers to a neutral position.

Figure 1:
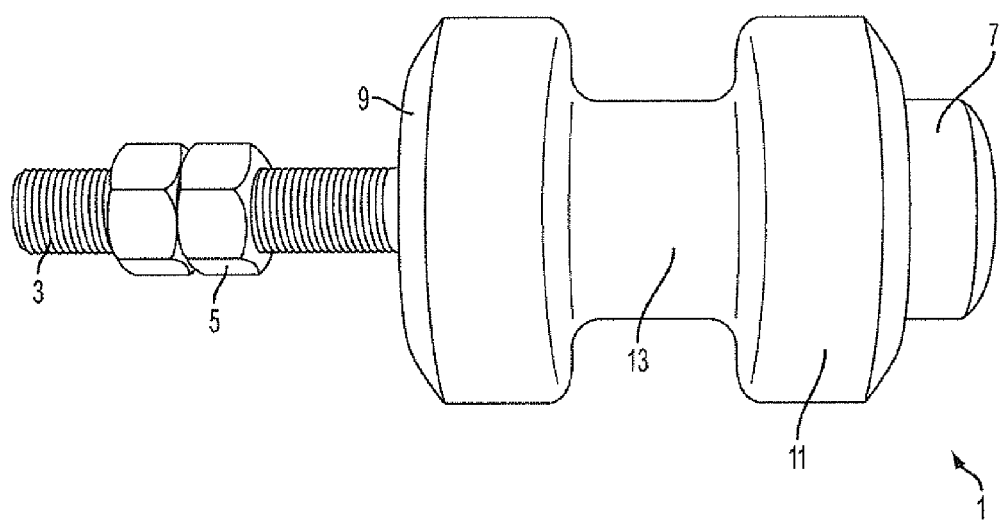
FIG. 1 is a top perspective view illustrating a singular guide roller for centering conveyor belts.
Figure 2:
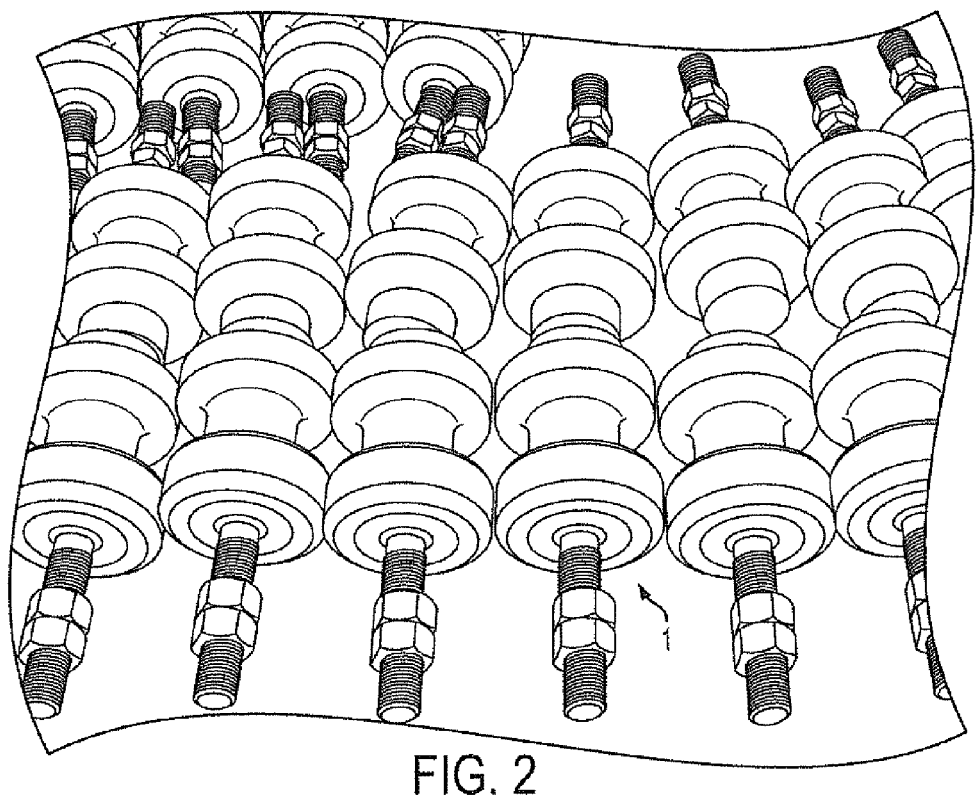
FIG. 2 is a top perspective view illustrating a plurality of guide rollers for centering conveyor belts.

Referring to FIGS. 1 and 2, there is shown a guide roller, shown generally at 1 in accordance with a first exemplary embodiment of the present invention.

In a preferred embodiment, as hereinafter described, the guide roller 1 is to be mounted onto a conveyor frame (not shown) by way of bolt 3, positioned at the distal end of the guide roller 1. It will be understood that there could be contemplated numerous variations as to the types of attachments to a conveyor frame that the guide roller 1 of the present invention could be utilized, as would be readily apparent to one skilled in the art. In this embodiment, the positioning of the guide roller 1 in relation to the conveyor frame can be adjusted through means of bolts 5, which are obviously used to set and secure the desired position of the guide roller 1 firmly in place. In this manner, the guide roller 1 itself, and without any other complicated parts or tools other than conventional tightening tools, can be easily and simply attached to a conveyor frame.

Preferably, and with reference to FIG. 1, the guide roller 1 will be made of a durable, machinable metal and has, preferably, a substantially cylindrical body 7 and is of a one-piece construction that comprises a first end 9, a second end 11 and an undercut portion 13 which are integrally connected to one another.

In the preferred embodiment, the first end 9 and the second end 11 of the guide roller 1 possess a greater diameter than that of the undercut portion 13, with the first end 9 and the second end 11 having a substantially similar diameter to each other. The undercut portion 13 is positioned in substantially a middle portion of the guide roller 1, and is designed to receive and secure therein a belt edge of a conveyor belt (not shown). Of course, by virtue of the first end 9 and the second end 11 of the guide roller 1 possessing a greater diameter than that of the undercut portion 13, and of course with the weight of the material on the conveyor belt pushing the belt downwardly into close contact with the guide roller 1, the belt edge of the conveyor is securely positioned in the undercut portion 13, and lateral straying or movement of the belt edge within undercut portion 13 is substantially inhibited by the presence of the first end 9 and the second end 11 of the guide roller 1, which, again, possess a greater diameter than that of the undercut portion 13. Such a belt edge can amount to one-half an inch thick, but could be variable of course. As such, the guide roller 1 is mounted in such a manner related to the belt, that the belt extends over the guide roller 1 such that the lateral edge of the belt substantially abuts within the inner undercut portion 13 of the guide roller 1. Thus, the guide roller 1 encapsulates the full movement of the conveyor belt in both lateral and vertical positions from the outer leading edge, so that it correctly travels in its proper longitudinal direction. Of course, as shown in FIG. 2, it is contemplated that a plurality of guide rollers 1 can be utilized depending upon the length, and width, of the belt.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

The embodiments of the invention in which an exclusive property or privilege is claimed are defined as follows:

1. A guide roller for use in a conveyor assembly, the guide roller comprising:
    a securing end for attachment to the conveyor assembly, the securing end being positioned at a distal end of the guide roller; and
    a substantially cylindrical body adapted to receive a conveyor belt of the conveyor assembly thereon which extends over the guide roller the body having:
    a first end;
    a second end disposed generally opposite said first end;
    an undercut portion positioned substantially between the first end and the second end and adapted to receive and secure therein a belt edge of a lower portion of a conveyor belt, the first end and the second each having a greater diameter than that of the undercut portion.

2. The guide roller of claim 1, wherein the securing end is a bolt.

3. The guide roller of claim 2, wherein the bolt is secured to the conveyor assembly by securing nuts.

\* \* \* \* \*